INVENTORS
STANLEY R. MORRISON
KENNETH M. SANCIER
THOMAS FREUND
BY Samuel Lindenberg
ATTORNEY 3,433,964
PHOTOELECTROSTATIC FLUID ANALYZER
Stanley R. Morrison, Los Altos, Kenneth M. Sancier, Portola Valley, and Thomas Freund, Woodside, Calif., assignors to Stanford Research Institute, Menlo Park, Calif., a corporation of California
Filed July 12, 1965, Ser. No. 471,214
U.S. Cl. 250—218    13 Claims
Int. Cl. G01n 21/26, 31/00; H01j 39/12

ABSTRACT OF THE DISCLOSURE

This invention relates to apparatus for analyzing impurities in fluids, and more particularly to a new photoelectrostatic fluid analyzer. The fluid steam containing the impurities is passed over a semiconductor which absorbs the impurities and is then exposed to light. The amount of current produced is an indication of the amount of impurity in the fluid.

---

An object of this invention is the provision of apparatus capable of extremely sensitive detection of the presence of impurities in fluids.

Yet another object of the present invention is the provision of a novel and simple photoelectrostatic fluid analyzer structure.

Still another object of the present invention is the provision of an arrangement which is extremely simple to operate and yet provides a reliable detection of the presence of impurities in fluids.

These and other objects of the present invention are achieved in a system wherein a conductive body has a semiconductive surface with charges thereover. This surface is exposed to a fluid stream, the impurity of which it is desired to be measured. By "fluid" is meant either a liquid or a gas. The impurity is absorbed on the semiconductor surface. After sufficient absorption has occurred, the surface is irradiated with light of wavelengths characteristic of the impurities of interest. In the presence of some of the surface charges, an impurity can absorb sufficient energy from the light so that an electron from the impurity can reach the conduction band of the semiconductor, cross over the semiconductor layer, and be absorbed by the metal underlying the semiconductor surface. Thus, the charge remaining on the surface or the charge flow into the body may be used as an indicator of the amount of impurity which was present in the fluid to which said surface was exposed. When the fluid is a gas, the semiconductive surface is first charged by exposure to a corona discharge and the static charge remaining on the surface after light irradiation measures the extent of the impurity present in the gas.

The detection of impurities in liquid streams is achieved in a system wherein a semiconductive surface (applied as a coating to an underlying conductive electrode) is immersed in the fluid to be analyzed, and is made the anode of an electrochemical cell. The semiconductor blocks the flow of current through the cell. After sufficient absorption has occurred, the surfaces are irradiated with light. Electrons associated with the impurity can absorb sufficient energy from the light to reach the conduction band of the semiconductor, cross over, and thereby provide an electrical current flow through the cell. Thus, the amount of current may be used as an indicator of the amount of impurity which is present in the liquid stream to which the surface is exposed.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
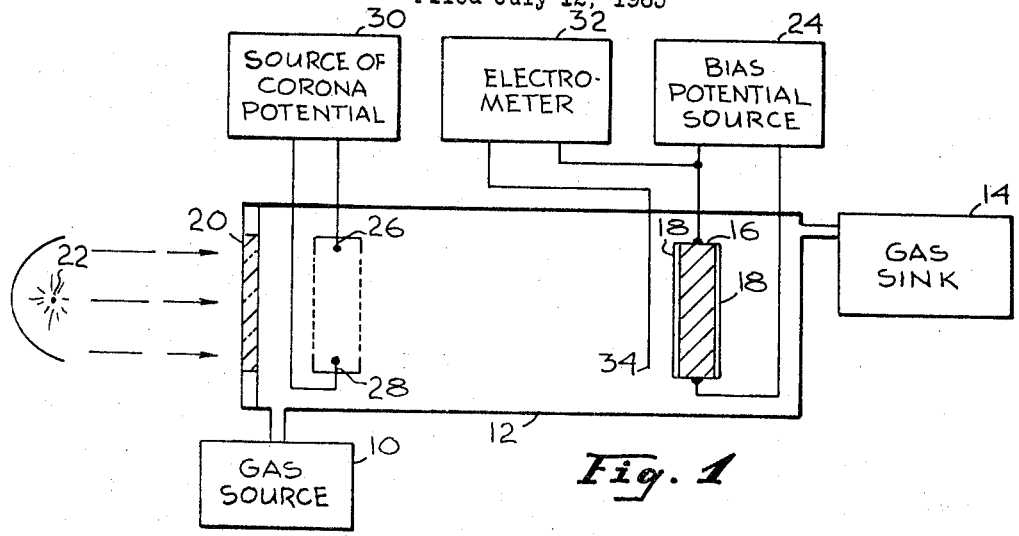
FIGURE 1 is a schematic drawing of an embodiment of this invention which may be employed with gases.

Reference is now made to FIGURE 1 of the drawings which shows an embodiment of this invention which may be used for analyzing gas. The gas to be analyzed is passed from a gas source 10 into an enclosure 12. The gas then passes out to a gas sink 14. The enclosure 12 contains a substrate 16 on the surfaces of which is deposited a film or layer 18 of a semiconductor material. The substrate material may be a conductive metal such as silicon or aluminum, having a thin outside layer grown on the surface ($SiO_2$ or $Al_2O_3$) for example. By way of example and not to be construed as a limitation, the thickness of the layer should be 100A to 5000A, depending on the voltage to be applied (the order of $10^7$ v./cm. can be applied before breakdown), and the trap density (with very imperfect films, the thin layer would be required to avoid space charge effects). The film 18 faces a transparent window 20 into which ultraviolet, or visible light, as required, may be shined, from a source 22.

Initially, a current is passed from a bias potential source 24 through the substrate 16, to heat it up in order to outgas the film 18 thereof. Thereafter, the heating current is turned off and the film 18 is charged by being sprayed with a corona discharge established between the electrodes 26, 28, from a source of corona potential 30. During the corona discharge, a potential, which is positive relative to the corona discharge potential, is applied to the substrate 16 in order to cause a negative charge to accumulate on the film 18. Other means, known to those skilled in the art, to induce a charge to accumulate on the film may be used, for example a cold cathode.

Gas is applied either during or following the charging phase, from the source 10 to the chamber 12 to flow over the surface 18 and cause a change in the photosensitivity of the surface. After a predetermined interval which enables a sufficient absorption of the impurities of the gas to occur, the film 18 is irradiated by light from the source 22, the radiation wavelength being characteristic of the optical absorption peak of the impurity or impurities of interest. The photoexcitation energy acts to enable the electrons associated with the impurity to be excited to the conduction band of the semiconductor film and to enter the metal substrate. The rate of discharge will depend on the light intensity, the optical absorbance of the impurity, the efficiency of electron transfer from the excited impurity to the semi-conductor, and to the quantity of impurity absorbed, the latter being related to the partial pressure of impurity in the gas stream. Thus, by measuring the change of the static voltage, which has occurred as a result of photoirradiation, one can determine the amount of the impurity present in the gas. The measurement of the static voltage may be performed for example by using an electrometer 32 which has a probe 34 adjacent the film 18. Initially, after the film 18 has been charged by the corona discharge, the electrometer 32 is energized to measure the amount of the charge present. After the photoirradiation of the film 18 has occurred, the electrometer is used to measure the remaining charge on the surface. By comparing these results with those obtained by the use of known standards, one can obtain an indication of the extent of impurity present in the gas.

The device which has been described can also be used as an ultraviolet or visible light sensor whose wavelength response can be controlled by using various gases or dyes on the surface of the semiconductor, such that the optical absorption peak of the gas or dye is at the wavelength of interest.

An important characteristic of the analyzer which has been described is that it is necessary that the impurity molecules in the gas that is employed have an optical absorption peak or band at lower energies than the band gap of the semiconductor absorbent. This requirement is necessary to avoid dissipation of the static charge merely by exciting hole-electron pairs in the solid, therefore light with photon energy equal or greater than the band gap cannot be used.

The choice of the semiconductor material should be made from wide band gap materials. As pointed out, it is necessary to form a thin film of such a semiconductor on a conducting surface. Preferable systems are those which include alumina on aluminum, or silica on silicon, these oxides having band gaps of about 7 e.v. (1800 A.).

The minimum detectability of an impurity gas depends upon (a) the amount of impurity absorbed, (b) the optical absorbance in the impurity, (c) the efficiency of the charge transfer between the excited absorbed molecule and the solid, (d) the multiplicative factor in the photosensitization, (e) the light intensity, and (f) the allowable time for the optical absorption and/or for the photoexcitation. By the multiplicative factor is meant the number of times a single impurity molecule can participate in the photoexcitation before the molecule photodecomposes.

There may be a possible interference from nonimpurity gases which should be evaluated. Their presence may not be significant if their optical absorption bands lie far in the ultraviolet ($CO_2$ and $H_2O$ in air), or if they lie far from the absorption peak of the impurity of interest, and/or if the molecules are weakly absorbed.

Catalytic reactions may occur on the semiconductor surface and may lead to desirable spectral changes. For example, oxidization or rearrangement of impurity molecules may result in absorption bands with higher optical absorbance and shift to longer wavelengths. It may be desirable to have such catalytic reactions occur in suitable reactors upstream of the gas analyzer.

It should be noted that the substrate and films will normally be outgassed prior to each use, either by passing an electrical current therethrough to cause the analyzer to be heated up or by heating the entire unit.

Figure 2:
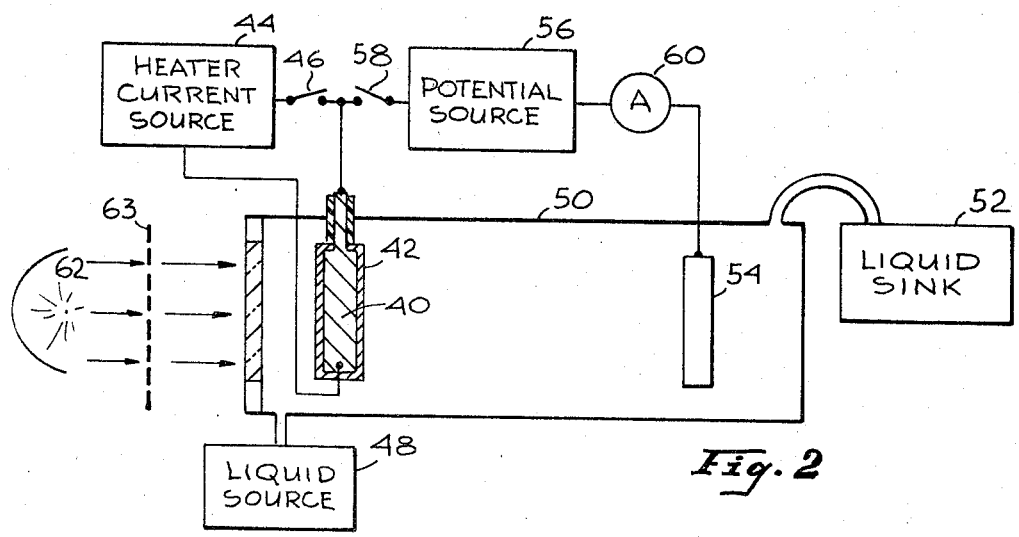
FIGURE 2 is a schematic drawing of an embodiment of this invention which may be employed with translucent or transparent liquids.

FIGURE 2 shows an embodiment of the invention which may be employed for the purpose of detecting liquid impurities using the principles of the invention as shown employed with gases in FIGURE 1, or reciprocally, being employed as a photodetector. The same type of detector is employed comprising a metal substrate 40, such as tantalum, on which there has been grown or deposited a semiconductor film 42, such as anodically formed tantalum oxide. Initially, in order to outgas the detector, it is heated by applying thereto current from a heating current source 44. The switch 46 is closed to enable the heating current to flow through the substrate. The switch 46 is thereafter opened.

Liquid from a source 48 is applied to the container 50 within which the detector 40, 42 is placed. This liquid flows over the detector and then out to a liquid sink 52.

Potential is applied between the detector 40, 42 and an electrode 54, spaced therefrom, from a potential source 56. The potential source is connected to the substrate 40 through a switch 58 which is closed to apply potential thereto. The potential source 56 is connected to the electrode 54 through an ammeter 60, which indicates the amount of current which is flowing through the liquid. This current is limited in amplitude by the oxide film 42. After an interval during which the film 42 absorbs impurities from the liquid, the light source 62 which has wavelength characteristic of the impurity or impurities to be detected, is turned on. A filter 63 or monochromatic illuminator may be used to exactly determine the wavelength of the light received from the source 63. The light excites electrons which have coupled to the absorbed impurities causing them to cross through the oxide film in the manner characteristic of these devices. As a result, there is a change in the current which flows between the detector and the electrode 54. This is indicated by the ammeter 60. The light wavelength at which this current peaks is characteristic of the impurity absorbed by the detector. The change of current in response to the light excitation is an indication of the amount of impurities present in the liquid.

It is clear that the lower the anodic current passing through the semiconductor in the dark, the more sensitive the system will be to low impurity concentrations. Anodized tantalum is an excellent example of the type of coating desired, for it provides a very low leakage oxide film, if the voltage applied during anodization is more than double the voltage applied in operation. Here again the optimum thickness of the film, controlled by the anodizing voltage, will depend on the trap concentration, a thicker film being permitted if low trapping and space charge effects are maintained, but films down to 100A may be necessary if the control of film quality is not good. As an alternative to initially heating the detector to outgas the surface thereof, it may be preferred to accomplish this function by passing a current through the cell, using a high voltage, thereby dissolving or oxidizing the outer layer of the oxide coating, which causes the desired cleaning.

The embodiment of the invention which is shown and described in FIGURE 2 is for a liquid which is substantially translucent or transparent. If the liquid is not, then an arrangement may be employed such as is shown schematically in FIGURE 3. A container 70 has one end thereof closed by the detector which in this instance comprises a substrate 72 of conducting glass, on which there has been deposited or grown a layer of silicon dioxide 74, for example. This is a wide energy gap semiconductor. Connection is made to the substrate 72 from a potential source 75 which also connects through a current flow meter 76 to an electrode 78. The container 70 is filled with the liquid to be analyzed. A potential is applied from the potential source 74, between the detector and the electrode 78, by closing the switch 82. The current which flows at this time is indicated by the meter 76.

After a predetermined interval, to enable absorption of impurities by the semiconductor layer 74, light is applied from the source 84. The change in current which occurs at that time, due to electrons transferring through the surface film 74 into the conductive base 72, may be used as an indication of the light characteristic of the absorption band of a given impurity molecule, or may be used to indicate the impurity in the liquid at the optical absorption wavelength characteristic of the impurity. An arrangement combining the essential features of FIGURES 1 and 3 may be employed with gases which are opaque.

Figure 3:
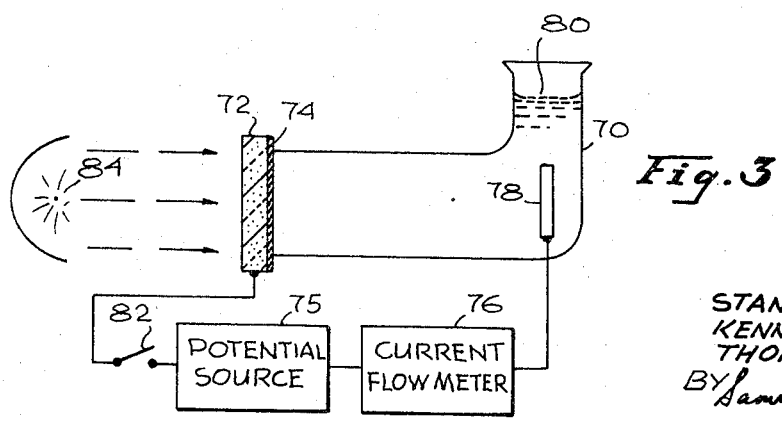
FIGURE 3 is a schematic drawing of an embodiment of this invention which may be employed with opaque liquids or gases.

By way of illustration of an embodiment of FIGURE 3 of the invention, which was built and successfully operated, a crystal of zinc oxide having a 0.3 cm.$^2$ surface area was used. In the presence of rose bengal dye, a simple tungsten light source and a monochromator stimulated a current increase of 0.3 na. due to the illumination at the absorption peak of the rose bengal dye, compared to a current increase of less than 0.01 na. at wavelengths substantially higher or lower. Zinc oxide has a relatively low energy gap (3 e.v.) and thus is not the best type of sensor for this purpose. With a high intensity light source, substantially higher stimulated currents may be obtained and may be easily detected, particularly if the light source is chopped.

It will be appreciated by those skilled in the art that not all optical absorption bands will result in the energy transfer of a charge to the conduction band (e.g. in the infrared). Also the semiconductor material selected must have a band gap energy greater than the photon energy being used. Thus, these optical absorption bands and materials are intended to be excluded. It will also be appreciated that this invention has a reciprocal utility, that is it can measure an impurity in a fluid or be used with different known light sources for analyzing the impurity in a field, or using the identical structures shown and described herein, if a dye having known optical absorption characteristics is coated on the semiconductor surface, the structure may be used as a photodetector.

There has accordingly been described and shown herein a novel, useful and unique arrangement for analyzing the impurities in a gas or a liquid, or for using the phenomena for detecting the intensity and wavelength of the light which is employed with the apparatus.

What is claimed is:

1. Photodetection apparatus comprising a conductive body having a layer of semiconductor material over the surface thereof, said layer having an electron charge on the surface thereof, a supply of a fluid including an impurity of the type which has the property that when applied to a semiconductor surface on which there are excess electrons photo sensitization by predetermined light wavelengths occurs such that electrons can transfer through said semiconductor material and conductive body surface into said conductive body, means for applying said fluid from said supply to said semiconductor layer surface, light means, means for irradiating said semiconductor layer surface with light from said light means, and means for measuring the number of electrons which enter said conductive body from said semiconductor layer surface in response to said irradiation.

2. Photodetection apparatus as recited in claim 1 wherein said impurity is a dye which is coated over said semiconductive layer surface by said means for applying said fluid.

3. Photodetection apparatus as recited in claim 1 wherein said fluid is a gas containing said impurity, and said means for applying said fluid is a container in which said body is placed and which is coupled to said supply of gas to receive said gas therefrom.

4. Photodetection apparatus as recited in claim 1 wherein said fluid is a liquid containing said impurity, and said means for applying said fluid is a container in which said body is placed and which is coupled to said supply of said liquid to receive said liquid therefrom.

5. Photodetection apparatus as recited in claim 1 wherein said fluid is a liquid containing said impurity, and said means for applying said fluid includes a container within which is said supply of said liquid, said conductive body is translucent and has a surface thereof covered by said liquid which is within said container.

6. Apparatus for detecting the impurities in a fluid comprising a conductive body having a layer on its surface made of semiconductor material, said semiconductor material having excess electrons on the semiconductive layer surface thereof, means for exposing said surface to said fluid to enable the adsorption of impurities from said fluid by said semiconductive layer surface, a source of light having a predetermined wavelength, means for irradiating said semiconductive layer surface with light from said source of light, and means for measuring the quantity of electrons which enter into said conductive body from said semiconductor material which is a function of the impurity in said fluid.

7. Apparatus as recited in claim 6 wherein said means for measuring the quantity of electrons which enter into said conductive body from said semiconductor material comprises electrometer means for measuring the change in charge on said semiconductive layer surface occurring due to irradiation of said surface by light.

8. Apparatus as recited in claim 6 wherein said means for measuring the quantity of electrons which enter into said conductive body from said semiconductor material comprises means for measuring the current flow which occurs due to the irradiation of said semiconductor surface by light.

9. Apparatus for detecting the amount of impurity in a gas comprising a conductive body having a layer of semiconductor material over the surface thereof, means for depositing a charge of electrons over said semiconductor layer, means for exposing said body to said gas for enabling the absorption of impurities from said gas by said surface of said body, a source of light having a predetermined wavelength, means for illuminating said semiconductive layer surface with light from said source of light, and means for measuring the change in charge on said semiconductive layer surface due to said light irradiation which is a function of the impurity concentration in said gas.

10. Apparatus as recited in claim 9 wherein there is included means for heating said body prior to depositing a charge of electrons thereon for driving occluded gas out of the surface thereof.

11. Apparatus for detecting the amount of impurity in a liquid comprising a container of said liquid, a conductive body having a layer of semiconductor material over the surface thereof immersed in said liquid, a potential source having first and second output terminals, means connecting said first output terminal to said conductive body, a current meter, an electrode immersed in said liquid, means connecting said current meter between said second output terminal and said electrode, and means for illuminating said surface with light from said source of light whereby a change in the current flowing through said meter is a function of the impurity concentration in said liquid.

12. Apparatus as recited in claim 11 wherein there is included means for cleaning said layer of semiconductor material comprising means for effecting a high current flow between said conductive body and said electrode whereby said layer of semiconductor material surface is cleaned.

13. Apparatus for measuring the impurity in a liquid comprising a conductive body made of a translucent material, a layer of semiconductor material deposited over one surface of said body, a container of said liquid, an electrode in said fluid, means for applying said one surface to the liquid in said container, a source of potential having a first and second output terminal, means for connecting said first output terminal to said conductive body, a current meter, means for connecting said current meter between said second output terminal and said electrode, a source of light at a predetermined frequency, means for illuminating said layer of semiconductive material with light from said source through said body whereby a change in the current flow indicated by said meter is a function of the impurity concentration in said liquid.

References Cited

UNITED STATES PATENTS 3,036,895 5/1962 Cole _____ 23—255 X
3,354,772 11/1967 Topol _____ 250—218 X WALTER STOLWEIN, *Primary Examiner.*

U.S. Cl. X.R.

23—254; 250—211